(12) United States Patent
Papasakellariou et al.

(10) Patent No.: US 9,398,573 B2
(45) Date of Patent: Jul. 19, 2016

(54) TRANSMISSION OF UPLINK CONTROL INFORMATION FOR COORDINATED MULTI-POINT RECEPTION

(71) Applicant: Samsung Electronics Co. Ltd., Suwon-si, Gyeonggi-do (KR)

(72) Inventors: Aris Papasakellariou, Dallas, TX (US); Youngbum Kim, Seoul (KR); Joonyoung Cho, Suwon-si (KR)

(73) Assignee: Samsung Electronics Co., Ltd., Suwaon-si (KR)

( * ) Notice: Subject to any disclaimer, the term of this patent is extended or adjusted under 35 U.S.C. 154(b) by 500 days.

(21) Appl. No.: 13/789,268

(22) Filed: Mar. 7, 2013

(65) Prior Publication Data

US 2013/0235853 A1 Sep. 12, 2013

Related U.S. Application Data

(60) Provisional application No. 61/608,232, filed on Mar. 8, 2012.

(51) Int. Cl.
| | |
|---|---|
| H04W 72/02 | (2009.01) |
| H04W 72/04 | (2009.01) |
| H04L 5/00 | (2006.01) |
| H04B 7/02 | (2006.01) |

(52) U.S. Cl.
CPC ......... *H04W 72/0413* (2013.01); *H04L 5/0023* (2013.01); *H04L 5/0053* (2013.01); *H04W 72/02* (2013.01); *H04W 72/04* (2013.01); *H04B 7/024* (2013.01)

(58) Field of Classification Search
None
See application file for complete search history.

(56) References Cited

U.S. PATENT DOCUMENTS

| | | | |
|---|---|---|---|
| 2011/0194551 A1* | 8/2011 | Lee et al. | 370/342 |
| 2011/0268080 A1 | 11/2011 | Luo et al. | |
| 2011/0299500 A1 | 12/2011 | Papasakellariou et al. | |
| 2011/0310855 A1* | 12/2011 | Yin et al. | 370/336 |
| 2012/0113831 A1* | 5/2012 | Pelletier et al. | 370/252 |
| 2012/0250663 A1* | 10/2012 | Han et al. | 370/336 |
| 2013/0128832 A1* | 5/2013 | Kang et al. | 370/329 |

FOREIGN PATENT DOCUMENTS

WO 2011-137408 A2 11/2011

OTHER PUBLICATIONS

Alcatel-Lucent Shanghai Bell et al., 'UCI Training Enhancement for CoMP', R1-120504, 3GPP TSG RAN WG1 #68, Dresden, Germany, Feb. 6-10, 2012.
Huawei et al., 'Enhancement for transmission of UCI on PUSCH', R1-112055, 3GPP TSG RAN WG1 #66, Athens, Greece, Aug. 22-26, 2011.

(Continued)

*Primary Examiner* — Omar Ghowrwal
*Assistant Examiner* — Angel Brockman
(74) *Attorney, Agent, or Firm* — Jefferson IP Law, LLP (57) ABSTRACT

Methods and apparatus for a User Equipment (UE) to determine a number of coded modulation symbols per spatial layer for an Uplink Control Information (UCI) type it multiplexes in a Physical Uplink Shared CHannel (PUSCH) is provided. The UE communicates with different sets of Reception Points (RPs) in different Transmission Time Intervals (TTIs) wherein two RPs in a same set of RPs have a communication latency that is smaller than or equal to a predetermined value and two RPs in two different respective sets of RPs have a communication latency that is larger than a predetermined value.

26 Claims, 8 Drawing Sheets

(56) References Cited

OTHER PUBLICATIONS

Catt, 'KARQ-ACK on UCI-only PUSCH without UL-SCH data' R1-113798, 3GPP TSG RAN WGI Meeting #67, San Francisco, USA, Nov. 14-18, 2011.

Samsung, 'Discussion on UCI transmission enhancements in Rel-11', R1-112522, 3GPP TSG RAN WG1 #66, Athens,Greece, Aug. 22-26, 2011.

LG Electronics, 'Discussion about UCI transmission enhancement', R1-112482, 3GPP TSG RAN WGI #66. Athens, Greece, Aug. 22-26, 2011.

* cited by examiner

TRANSMISSION OF UPLINK CONTROL INFORMATION FOR COORDINATED MULTI-POINT RECEPTION

CROSS-REFERENCE TO RELATED APPLICATIONS

This application claims the benefit under 35 U.S.C. §119 (e) of a U.S. Provisional application filed on Mar. 8, 2012 in the U.S. Patent and Trademark Office and assigned Ser. No. 61/608,232, the entire disclosure of which is hereby incorporated by reference.

BACKGROUND OF THE INVENTION

1. Field of the Invention

The present invention is directed generally to wireless communication systems and, more specifically, to the transmission of control information to one from multiple reception points.

2. Description of the Art

A communication system includes a DownLink (DL) that conveys signals from one or more Transmission Points (TPs) to User Equipments (UEs) and an UpLink (UL) that conveys signals from UEs to one or more Reception Points (RPs). A UE, also commonly referred to as a terminal or a mobile station, may be fixed or mobile and may be a wireless device, a cellular phone, a personal computer device, etc. A TP or a RP is generally a fixed station and may also be referred to as a Base Transceiver System (BTS), a NodeB, an access point, etc.

DL data information is conveyed through a Physical DL Shared CHannel (PDSCH). DL Control Information (DCI) for scheduling a PDSCH or a PUSCH transmission is conveyed through a respective DCI format transmitted in a Physical DL Control CHannel (PDCCH).

UL data information is conveyed through a Physical UL Shared CHannel (PUSCH). UL Control Information (UCI) is conveyed through a Physical UL Control CHannel (PUCCH) unless a UE transmits a PUSCH in which case at least some UCI can be included in the PUSCH. A UE may also simultaneously transmit data information in a PUSCH and UCI in a PUCCH.

UCI includes ACKnowledgment information, associated with a Hybrid Automatic Repeat reQuest (HARQ) process (HARQ-ACK), a UE transmits in response to receiving data Transport Blocks (TBs), Channel State Information (CSI) which informs a NodeB of a DL channel medium a UE experiences, and Rank Indicator (RI) information associated with spatial multiplexing of PDSCH transmissions to the UE. An UL RS can be used for demodulation of data or control signals, in which case it is referred to as DMRS, or for sounding an UL channel medium to provide UL CSI to a set of RPs, in which case it is referred to as Sounding RS (SRS).

Figure 1:
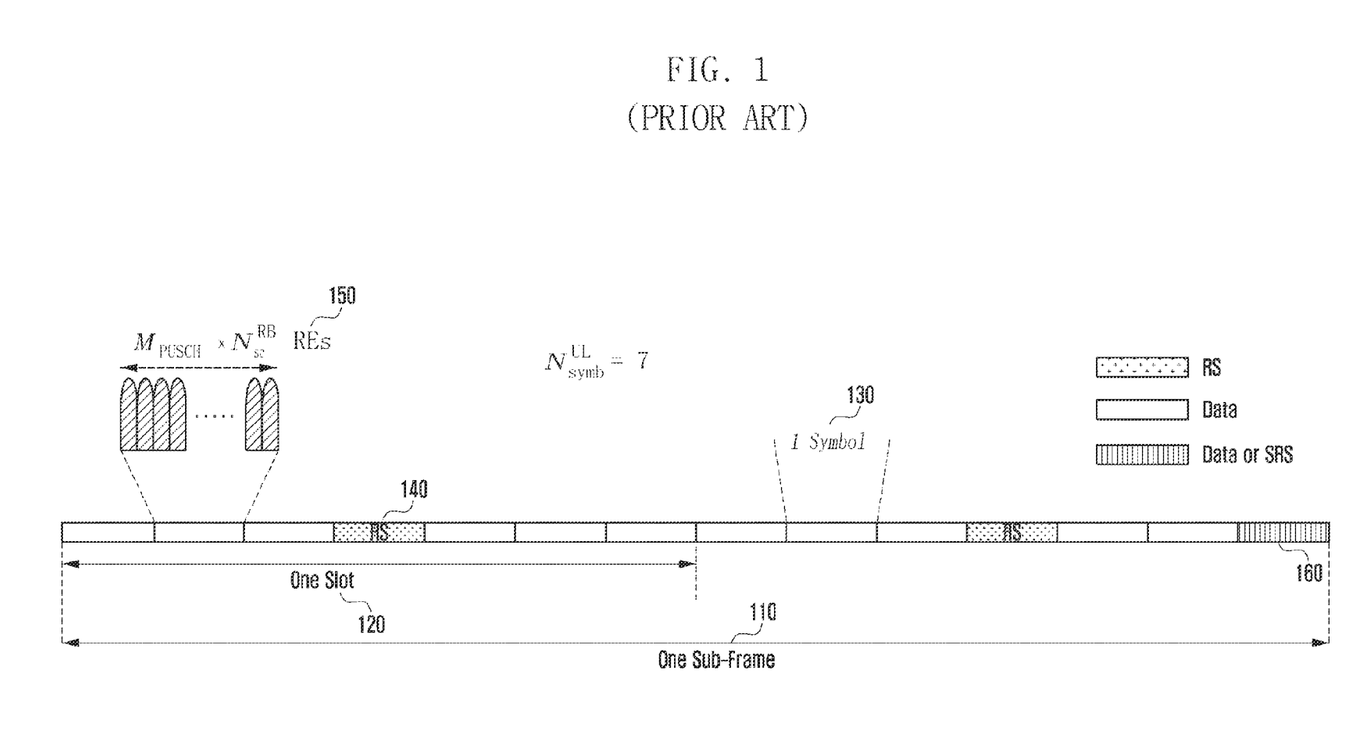
FIG. 1 is a diagram illustrating a PUSCH transmission over a TTI according to the related art.

FIG. 1 illustrates a PUSCH transmission over a Transmission Time Interval (TTI) according to the related art.

Referring to FIG. 1, a TTI consists of one subframe 110 which includes two slots. Each slot 120 includes $N_{symb}^{UL}$ symbols 130. Some symbols in each slot are used to a transmit DMRS 140. The transmission BandWidth (BW) includes frequency resource units referred to as Resource Blocks (RBs). Each RB includes $N_{sc}^{RB}$ sub-carriers, or Resource Elements (REs), and a UE is allocated $M_{PUSCH}$ RBs 150 for a total of $M_{sc}^{PUSCH} = M_{PUSCH} \cdot N_{sc}^{RB}$ REs for a PUSCH transmission BW. A unit of one RB over one TTI is referred to as a Physical Resource Block (PRB). The last subframe symbol may be used to transmit SRS 160 from one or more UEs. The number of subframe symbols for data/UCI/DMRS transmission is $N_{symb}^{PUSCH} = 2 \cdot (N_{symb}^{UL} - 1) - N_{SRS}$ where $N_{SRS}=1$ if the last subframe symbol is used to transmit SRS and $N_{SRS}=0$ otherwise.

Figure 2:
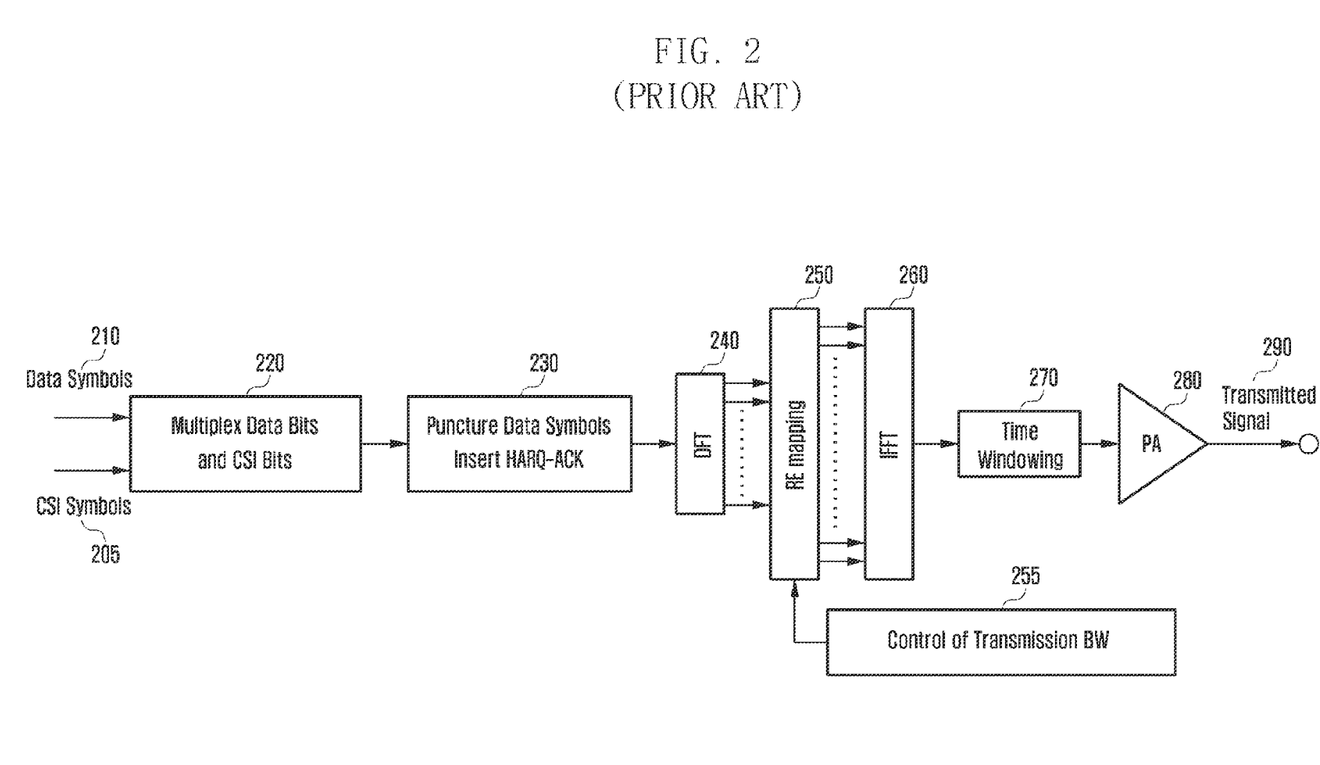
FIG. 2 is a block diagram illustrating a transmitter for data information and UCI in a PUSCH according to the related art.

FIG. 2 illustrates a transmitter block diagram for data information and UCI in a PUSCH according to the related art.

Referring to FIG. 2, coded CSI symbols 205 and coded data symbols 210 are multiplexed by multiplexer 220. Coded HARQ-ACK symbols are then inserted by multiplexer 230 by puncturing data symbols and/or CSI symbols. A transmission of coded RI symbols is similar to the one for coded HARQ-ACK symbols (not shown). The Discrete Fourier Transform (DFT) is obtained by DFT unit 240, the REs 250 corresponding to a PUSCH transmission BW are selected by selector 255, the Inverse Fast Fourier Transform (IFFT) is performed by IFFT unit 260, the output is filtered and by filter 270, the signal is applied a certain power by Power Amplifier (PA) 280 and it is then transmitted 290. For brevity, additional transmitter circuitry such as digital-to-analog converter, analog filters, amplifiers, and transmitter antennas as well as encoders and modulators for the data symbols and the UCI symbols are omitted for brevity.

Figure 3:
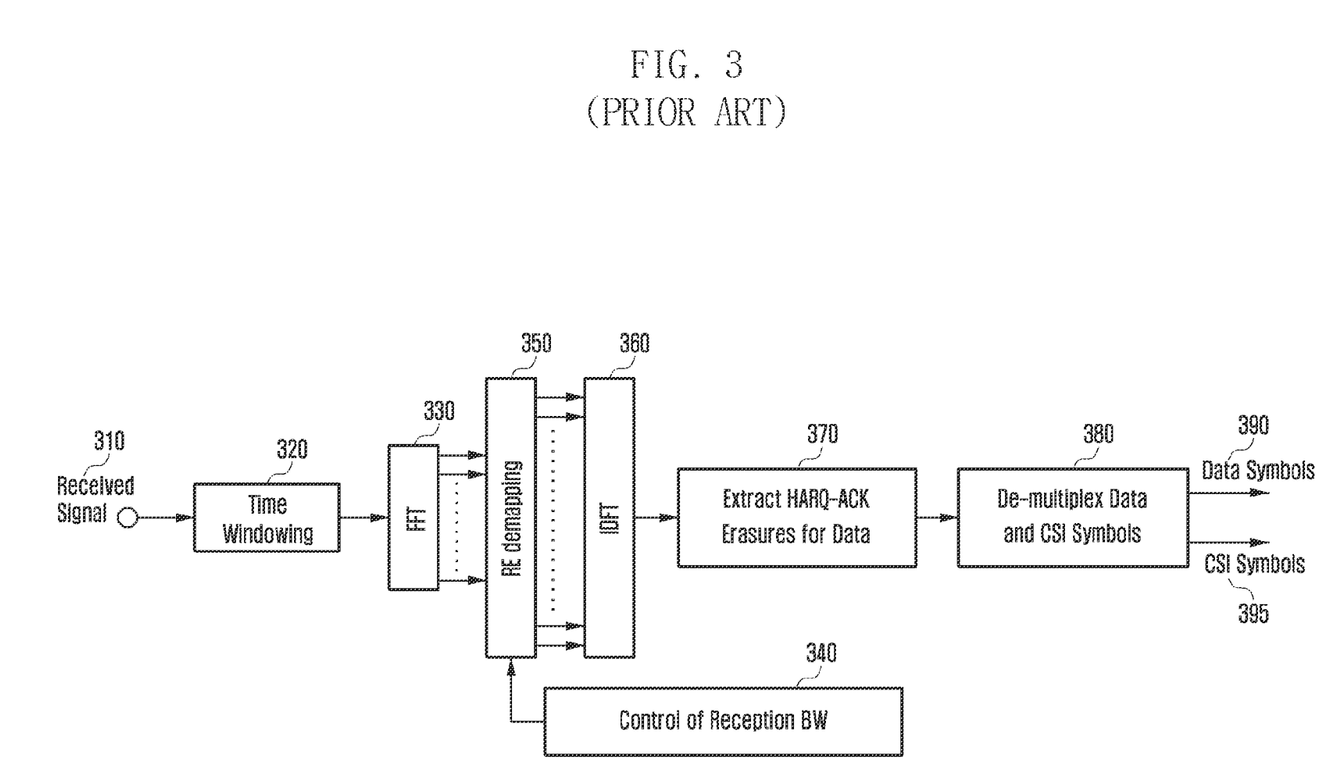
FIG. 3 is a block diagram illustrating a receiver for data information and UCI in a PUSCH according to the related art.

FIG. 3 illustrates a receiver block diagram for data information and UCI in a PUSCH according to the related art.

Referring to FIG. 3, after an antenna receives the analog signal and after further processing units (such as filters, amplifiers, frequency down-converters, and analog-to-digital converters) which are not shown for brevity, the digital signal 310 is filtered by filter 320, a Fast Fourier Transform (FFT) is applied by FFT unit 330, a selector unit 340 selects the REs 350 used by the transmitter, an Inverse DFT (IDFT) unit applies an IDFT 360, a de-multiplexer 370 extracts the coded HARQ-ACK symbols and places erasures in the corresponding REs for data symbols and CSI symbols and finally another de-multiplexer 380 separates coded data symbols 390 and coded CSI symbols 395. A reception of coded RI symbols is similar to the one for coded HARQ-ACK symbols (not shown). Additional receiver circuitry such as a channel estimator, demodulators and decoders for data symbols and UCI symbols are not shown for brevity.

Assuming for simplicity a transmission of one data TB in a PUSCH, a UE determines a number of coded modulation symbols per layer Q' for HARQ-ACK as in Equation (1)

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{(Eq. 1)}$$

In Equation 1, $\lceil\ \rceil$ is the ceiling function rounding a number to its next integer, O is a number of HARQ-ACK information bits, $M_{sc}^{PUSCH}$ is a PUSCH transmission BW in the current subframe for the data TB, $N_{symb}^{PUSCH-initial}$ is the number of subframe symbols for initial PUSCH transmission for the same data TB, $\beta_{offset}^{PUSCH} = \beta_{offset}^{HARQ-ACK}$ is a value signaled to the UE from a TP by higher layer signaling, $M_{sc}^{PUSCH-initial}$ is a PUSCH transmission BW for initial PUSCH transmission for the same data TB, C is a number of code blocks, and $K_r$ is a number of bits for code block number r. When a PUSCH contains only CSI, in addition to HARQ-ACK, the UE determines a number of coded modulation symbols per layer Q' for HARQ-ACK as Q'=min ($\lceil O \cdot M_{sc}^{PUSCH} \cdot N_{symb}^{PUSCH} \cdot \beta_{offset}^{HARQ-ACK}/O_{CSI-MIN} \rceil$, $4 \cdot M_{sc}^{PUSCH}$), where $O_{CSI-MIN}$ is a minimum number of CSI information bits including Cyclic Redundancy Check (CRC) bits. A same determination for a number of coded modulation symbols per layer Q' applies for a transmission of RI with $\beta_{offset}^{PUSCH}$ replaced by $\beta_{offset}^{RI}$. For CSI, a number of coded modulation symbols per layer is determined as Q' as $$Q' = \min\left(\left\lceil (O+L) \cdot M_{sc}^{PUSCH-initial} \cdot N_{symb}^{PUSCH-initial} \cdot \beta_{offset}^{CSI} \middle/ \sum_{r=0}^{C-1} K_r \right\rceil, \right.$$

$$\left. M_{sc}^{PUSCH} \cdot N_{symb}^{PUSCH} - \frac{Q_{RI}}{Q_m} \right)$$

where O is a number of CSI bits, L is a number of CRC bits given by $$L = \begin{cases} 0 & O \leq 11 \\ 8 & \text{otherwise} \end{cases},$$

and $Q_m$ is the number of information bits per modulation symbol. If RI is not transmitted then $Q_{RI}^{(x)}=0$. The encoding process for the HARQ-ACK bits or RI bits or CSI bits is not discussed as it is not material to the objects of the present invention.

A transmission of an UL RS (DMRS or SRS) is through a Zadoff-Chu (ZC) sequence. UCI signals can also be transmitted in a PUCCH using a ZC sequence. Similar to a PUSCH transmission structure, a PUCCH transmission structure consists of one subframe which includes two slots and each slot also includes $N_{symb}^{UL}$ symbols. The exact partitioning of a PUCCH slot for transmissions of RS or UCI signals is not material to embodiments of the present invention and a respective description is omitted for brevity. A ZC sequence used to transmit an UL RS or a UCI signal can be generated directly in the frequency domain and a DFT is then be bypassed.

Improving coverage and cell-edge throughput are key objectives in a communication system. Coordinated Multi-Point (CoMP) transmission/reception and Carrier Aggregation (CA) are important techniques in achieving these objectives. CoMP enables a UE in a cell-edge region to reliably receive signals from a first set of NodeBs (DL CoMP) or reliably transmit signals to a second set NodeBs (UL CoMP). A set of NodeBs for DL CoMP or DL CA is referred to as a set of TPs while a set of NodeBs for UL CoMP or UL CA is referred to as a set of RPs. CA operation also enables a UE to communicate with different TPs or RPs, either in a same TTI or in different TTIs, which enables interference co-ordination, improved spectral efficiency, or high data rates for a UE connected to a pico cell while maintaining a coverage link with a macro cell.

Figure 4:
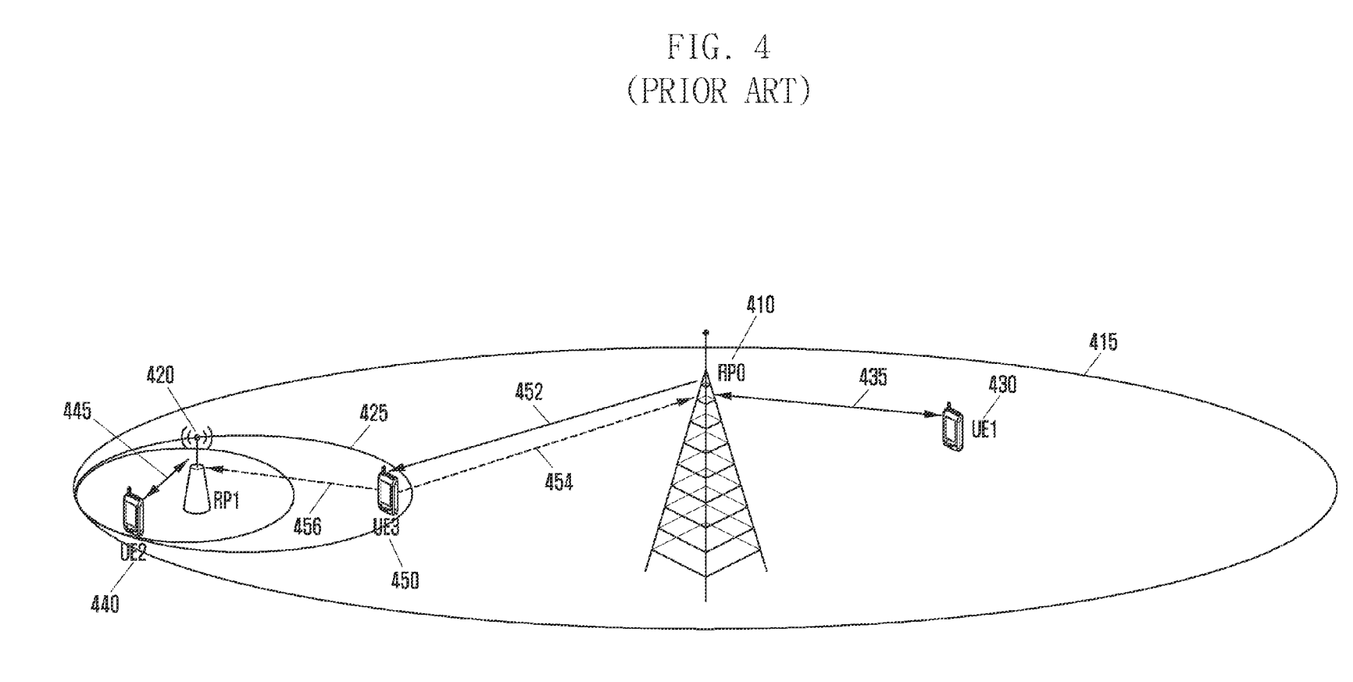
FIG. 4 is a diagram illustrating an UL CoMP operation according to the related art.

FIG. 4 illustrates an UL CoMP operation according to the related art.

Referring to FIG. 4, a network includes a macro-NodeB 410 having a first DL coverage area 415 and a pico-NodeB 420 having a second DL coverage area 425. A macro-NodeB transmits with substantially larger power than a pico-NodeB and has a much larger DL coverage area. UE1 430 communicates in both DL and UL 435 with a macro-NodeB which provides both a single TP and a single RP for UE1. UE2 440 communicates in both DL and UL 445 with a pico-NodeB which provides both a single TP and a single RP for UE2. As a macro-NodeB transmits with larger power, it is a TP for UE3 450. However, in the UL, it is generally beneficial for a UE to communicate with a RP for which it experiences a smallest path-loss or a smallest interference. For UEs located at a similar distance to a macro-NodeB and a pico-NodeB, the RP can be either or both of these two nodes. For nodes that are not co-located, it is generally simpler to operate with a single RP. For UE3, this RP can be a macro-NodeB 454 or a pico-NodeB 456. The RP can change on a subframe basis considering cell loading or interference experienced by each node. This selection is referred to as Dynamic Point Selection (DPS).

Although FIG. 4 considers a pico-NodeB having a different cell identity than a macro-NodeB, a respective network operation is same if instead of a pico-NodeB a Remote Radio Head (RRH) having a same cell identity as a macro-NodeB is used. Then, in order to differentiate between a macro-NodeB and a RRH, a virtual cell identity may be assigned to an RRH to practically provide same functionalities as a physical cell identity for a pico-NodeB.

A key issue for CoMP operation or inter-NodeB CA operation is the connection speed between different NodeBs. Typical cable connections incur large data transfer delays and this requires that all delay sensitive control information be transmitted from or received at the NodeB performing the scheduling. Conversely, fiber optic links incur very small delays compared to the subframe duration, especially over short distances, and allow control information to be transmitted from or received at a NodeB other than the NodeB performing the scheduling as it can be quickly transferred from or to the latter NodeB. CoMP operation resembles CA operation with inter-NodeB scheduling. With CA, PUSCH or SRS transmissions on each cell have individual respective parameters including for power control and for ZC sequences.

For UL CoMP or inter-NodeB UL CA, different cells served by different NodeBs/RPs may operate with different BLER targets for data TBs according to the path-loss, UE loading, and interference conditions experienced by respective UEs. For intra-NodeB UL CA, different cells simply serve as data pipes in order to increase data rates and typically target a same BLER for data TBs from a UE as they intend to provide equivalent quality of service.

One consequence of the above operational differences between UL CoMP or inter-NodeB UL CA and intra-NodeB UL CA is that, as the UCI BLER is linked to the BLER of data TBs in a PUSCH, the UCI BLER in case of intra-NodeB UL CA is typically the same regardless of the PUSCH conveying the UCI but this may not apply in case of DPS UL CoMP or inter-NodeB UL CA. It is important to ensure the UCI BLER targets as, unlike data TBs, UCI does not benefit from HARQ retransmissions and has fixed BLER targets.

Another consequence is that for different locations of RPs, UCI may not be timely processed at the RP where the scheduler is located if UCI is included with data information in a PUSCH intended for another RP. As UCI is more delay sensitive than data information, it is beneficial to decouple the RP of UCI from the RP of data information especially for UL CoMP or inter-Node N UL CA operation over a slow backhaul link.

Therefore, there is a need to ensure UCI BLER targets for UL CoMP operation or for inter-NodeB UL CA operation.

There is another need to adjust a number of coded modulation symbols of a UCI type according to an intended RP.

Finally, there is another need to decouple UCI transmission from data information transmission for UL CoMP or for inter-NodeB UL CA.

The above information is presented as background information only to assist with an understanding of the present disclosure. No determination has been made, and no assertion is made, as to whether any of the above might be applicable as prior art with regard to the present invention.

SUMMARY OF THE INVENTION

Accordingly, the present invention has been designed to solve at least the aforementioned limitations and problems in the prior art and the present invention provides methods and apparatus for a UE to determine a number of coded modulation symbols per spatial layer for a UCI type multiplexed in a PUSCH, depending on an intended RP for the PUSCH, and to determine whether to multiplex UCI in a PUSCH intended for a first RP or in a PUCCH intended for a second RP depending on the communication latency between the first RP and the second RP.

In accordance with an embodiment of the present invention, a UE communicating with a different set of RPs, from one of $\{1, \ldots, N_{RP}\}$ sets of RPs, in different TTIs receives higher layer signaling informing of $\{\beta_{offset,1}^{UCI-type}, \ldots, \beta_{offset,N_{RP}}^{UCI-type}\}$ values associated with a determination of a number of coded modulation symbols per spatial layer Q' for a respective UCI type in a PUSCH. Depending on the set of RPs $n_{RP}$, from the $\{1, \ldots, N_{RP}\}$ sets of RPs, that a UE transmits a PUSCH, the UE uses a respective $\beta_{offset,n_{RP}}^{UCI-type}$ value to determine Q'. Each of the $\{\beta_{offset,1}^{UCI-type}, \ldots, \beta_{offset,N_{RP}}^{UCI-type}\}$ values can be informed to the UE by separate information elements of higher layer signaling which can further include an identity of a respective set of RPs. When the UCI type is HARQ-ACK or RI, the number of coded modulation symbols per spatial layer Q' is determined as $$Q' = \min\left(\left\lceil \frac{O \cdot M_{sc}^{PUSCH-initial} \cdot N_{symb}^{PUSCH-initial} \cdot \beta_{offset,n_{RP}}^{UCI-type}}{\sum_{r=0}^{C-1} K_r} \right\rceil, 4 \cdot M_{sc}^{PUSCH}\right)$$

where O is a number of information bits, $\beta_{offset,n_{RP}}^{UCI-type} = \beta_{offset,n_{RP}}^{HARQ-ACK}$ for HARQ-ACK or $\beta_{offset,n_{RP}}^{UCI-type} = \beta_{offset,n_{RP}}^{RI}$ for RI, $M_{sc}^{PUSCH}$ is a PUSCH transmission BW in the TTI, $N_{symb}^{PUSCH-initial}$ is a number of TTI symbols for initial PUSCH transmission for a same data TB, $M_{sc}^{PUSCH-initial}$ is a PUSCH transmission BW for initial PUSCH transmission for a same data TB, C is a number of code blocks, and $K_r$ is a number of bits for code block number r. For any two RPs in a same set of RPs, the latency of information exchange is smaller than or equal to a predetermined value and for any two RPs in different sets of RPs the latency of information exchange is larger than a predetermined value. At least one set of RPs from the $\{1, \ldots, N_{RP}\}$ sets of RPs can include only one RP. A UE determines the one set $n_{RP}$ from signaling scheduling the PUSCH or from a number of the TTI in a total number of TTIs.

In accordance with another embodiment of the present invention, a UE transmitting UCI to a set of RPs $n_{RP}^{sp}$, from $\{1, \ldots, N_{RP}\}$ sets of RPs, during a TTI and transmitting data information in a PUSCH to a set of RPs $n_{RP}^{nsp}$, from the $\{1, \ldots, N_{RP}\}$ sets of RPs, during the TTI determines the set of RPs $n_{RP}^{sp}$ for transmitting the UCI and either transmits the UCI in a PUCCH if the set of RPs $n_{RP}^{sp}$ is not same as the set of RPs $n_{RP}^{nsp}$ or transmits the UCI in the PUSCH if the set of RPs $n_{RP}^{sp}$ is same as the set of RPs $n_{RP}^{nsp}$. A PUSCH or PUCCH transmission to a set of RPs uses transmission parameters, such as a scrambling sequence for scrambling respective data information or UCI or a Zadoff-Chu sequence for generating a reference signal, associated with the set of RPs. At least one set of RPs from the $\{1, \ldots, N_{RP}\}$ sets of RPs includes only one RP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE INVENTION

Various embodiments of the present invention will now be described more fully hereinafter with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to Discrete Fourier Transform (DFT)-spread Orthogonal Frequency Division Multiplexing (OFDM), they also are applicable to all Frequency Division Multiplexing (FDM) transmissions in general and to OFDM in particular.

Moreover, although the embodiments of the present invention for UCI signaling will be described mainly with respect to an UL CoMP operation, they are also applicable to UCI signaling intended for different RPs in general and to UCI signaling for inter-NodeB UL CA operation in particular.

The first embodiment of the present invention considers the fulfillment of UCI BLER targets when an UL CoMP method, such as DPS, is used for a PUSCH transmission by a UE and an intended RP, among a set of geographically separated RPs, may change at a rate of a subframe or a few subframes or at a slower rate such as in tens of subframes. DPS can be indicated either dynamically by a DCI format scheduling a respective PUSCH transmission or the selection of the intended set of RPs can have a predetermined pattern across subframes in a number of subframes. In general, the first embodiment of the present invention considers that a UE connected to at least two RPs, in some subframes in a number of subframes transmits PUSCH to a first RP and in the other subframes in the number of subframes the UE transmits PUSCH to a second RP.

Allowing a set of intended RPs to change at a fast rate, such as a subframe rate, enables a scheduler to dynamically select RPs for a PUSCH according to some desired metric when performing the scheduling decisions. This metric may be a minimization of a PUSCH transmission power, a minimization of inter-cell interference, load balancing of PUSCH transmissions in different cells, and so on. Additionally, allowing a set of intended RPs to change at a subframe rate, allows a UE to communicate with a first RP in some subframes and with a second RP in the other subframes, such as for example in case of inter-NodeB UL CA, without requiring that a backhaul connection between the two RPs has negligible latency.

As higher layer signaling, such as Radio Resource Control Signaling (RRC) signaling, typically requires tens of subframes to be processed by a UE, RP selection for UL CoMP or inter-NodeB UL CA may be either through a predetermined corresponding subframe pattern or through a DCI format conveyed by a PDCCH scheduling a PUSCH. For example, in the former case and with a periodicity of 10 subframes, a UE can transmit PUSCH to RP1 in subframes 0, 3, 6, and 9 and transmit PUSCH to RP2 in subframes 1, 2, 4, 5, 7, and 8. In the latter case, a field can be included in DCI formats for UEs configured with UL CoMP (or UL CA) to indicate the intended cell for a PUSCH transmission. For example, for UL CoMP limited to a configuration of two RPs, such as a macro-NodeB and a pico-NodeB, a 1-bit field in DCI formats scheduling PUSCH transmissions may suffice. Alternatively, some states of one or more existing fields in such DCI formats may be used to implicitly indicate PUSCH transmission to a first set of RP(s) and the remaining states may implicitly indicate PUSCH transmission to a second set of RP(s). A UE can adjust the respective PUSCH transmission parameters (such as scrambling sequences for data information or UCI, ZC sequences, SRS configuration, and so on) according to an intended set of RPs in order to be compliant with ones used in the intended cell.

Assuming that a target BLER for data TBs in each cell configured for UL CoMP to a UE remains practically invariant over tens of subframes, different $\beta_{offset}^{PUSCH}$ values can be associated with each cell and can be configured and updated to a respective UE through higher layer signaling. Therefore, a UE configured with a set of $\{1, \ldots, N_{RP}\}$ sets of RP(s) is also configured with a respective set of $\{\beta_{offset,1}^{PUSCH}, \ldots, \beta_{offset,N_{RP}}^{PUSCH}\}$ values for each UCI type (different sets of $\beta_{offset}^{PUSCH}$ values can be configured for HARQ-ACK, RI, and CSI). The configuration can be separate per set of RPs together with an identity for a set or RPs and with other parameters, such as a scrambling sequence or a ZC sequence, that are applicable to transmissions of data information or UCI to the set of RPs.

When a DCI format detected by a UE configured with UL CoMP indicates scheduling for PUSCH transmission to RP set $n_{RP}$, from the configured set of sets of RP(s), or in general when the UE transmits PUSCH to RP set $n_{RP}$ and the UE multiplexes UCI in a PUSCH in a subframe, the UE uses $\beta_{offset,n_{RP}}^{PUSCH}$ to determine the number of coded UCI symbols Q' as described for example in Equation (1) when the UCI is HARQ-ACK.

The configuration of different $\beta_{offset}^{PUSCH}$ values for different RPs can be extended in a same manner for UL CA operation. For example, when a UE is configured two cells for UL CA that operate in two respective different parts of the spectrum (inter-NodeB UL CA), it may be difficult for a NodeB scheduler to ensure a same BLER for transmissions of data TBs in respective PUSCHs in the two different cells as the path-losses experienced by the PUSCH transmissions can be significantly different.

Figure 5:
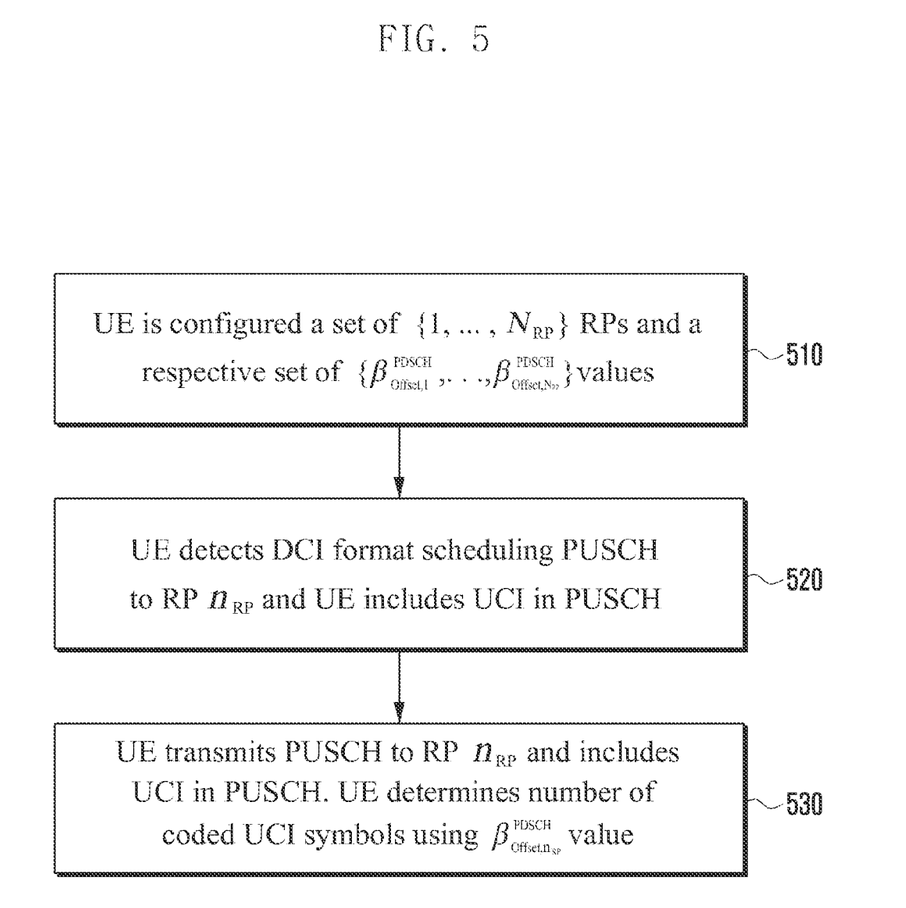
FIG. 5 is a diagram illustrating a use of a $\beta_{offset}^{PUSCH}$ value, from a number of $\beta_{offset}^{PUSCH}$ values, by a UE to determine a number of coded UCI symbols in a PUSCH transmitted to a set of RP(s) for a number of sets of RPs.

FIG. 5 illustrates a use of a $\beta_{offeset}^{PUSCH}$ value, from a number of $\beta_{offset}^{PUSCH}$ values, by a UE to determine a number of coded UCI symbols in a PUSCH transmitted to a set of RP(s) for a number of sets of RPs.

Referring to FIG. 5, a UE is configured by higher layers a set of $\{1, \ldots, N_{RP}\}$ sets of RP(s) and a respective set of $\{\beta_{offset,1}^{PUSCH}, \ldots, \beta_{offset,N_{RP}}^{PUSCH}\}$ values for each UCI type 510. Upon detecting a PDCCH conveying a DCI format scheduling PUSCH to RP set $n_{RP}$ when the UE also needs to include UCI in that PUSCH 520, the UE multiplexes UCI in the PUSCH to RP set $n_{RP}$ using a configured $\beta_{offset,n_{RP}}^{PUSCH}$ value for the respective UCI type ($\beta_{offset,n_{RP}}^{HARQ-ACK}$ for HARQ-ACK, $\beta_{offset,n_{RP}}^{PUSCH}$ for RI, $\beta_{offset,n_{RP}}^{PUSCH}$ for CSI) to determine the associated number of coded UCI symbols 530. The RP set $n_{RP}$ may consist of one or more RPs.

Figure 6:
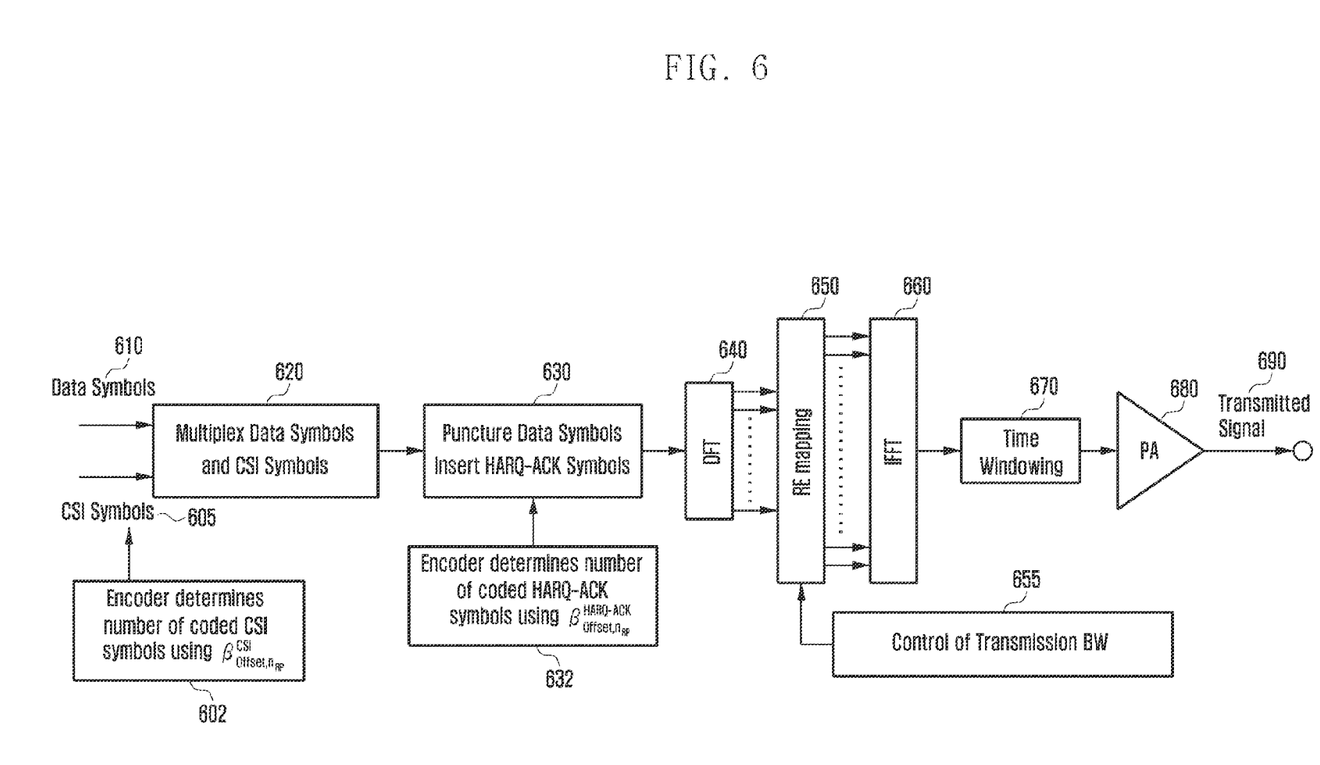
FIG. 6 is a block diagram illustrating a transmitter for data information, CSI, and HARQ-ACK in a PUSCH for an indicated set of one or more RPs.

FIG. 6 illustrates a transmitter block diagram for data information, CSI, and HARQ-ACK in a PUSCH for an indicated set of one or more RPs.

Referring to FIG. 6, for a PUSCH transmission to RP set $n_{RP}$, a CSI encoder determines a number of coded CSI symbols (if any) 602 using a $\beta_{offset,n_{RP}}^{CSI}$ value configured for a respective RP set $n_{RP}$ through higher layer signaling. Subsequently, coded CSI symbols 605 and coded data symbols (if any) 610 are multiplexed by multiplexer 620. A HARQ-ACK encoder determines a number of coded HARQ-ACK symbols (if any) 602 using a $\beta_{offset,n_{RP}}^{HARQ-ACK}$ value configured for a respective RP set $n_{RP}$ through higher layer signaling 632 (for brevity, existence of RI is not considered). Coded HARQ-ACK symbols (if any) are then inserted by multiplexer 630 by puncturing coded data symbols and/or coded CSI symbols. The DFT is obtained by DFT unit 640, the REs 650 corresponding to a PUSCH transmission BW are selected by selector 655, the IFFT is performed by IFFT unit 660, the output is filtered and by filter 670, the signal is applied a certain power by PA 680 and it is then transmitted 690. The modulators for the data symbols and the UCI symbols are omitted for brevity.

Figure 7:
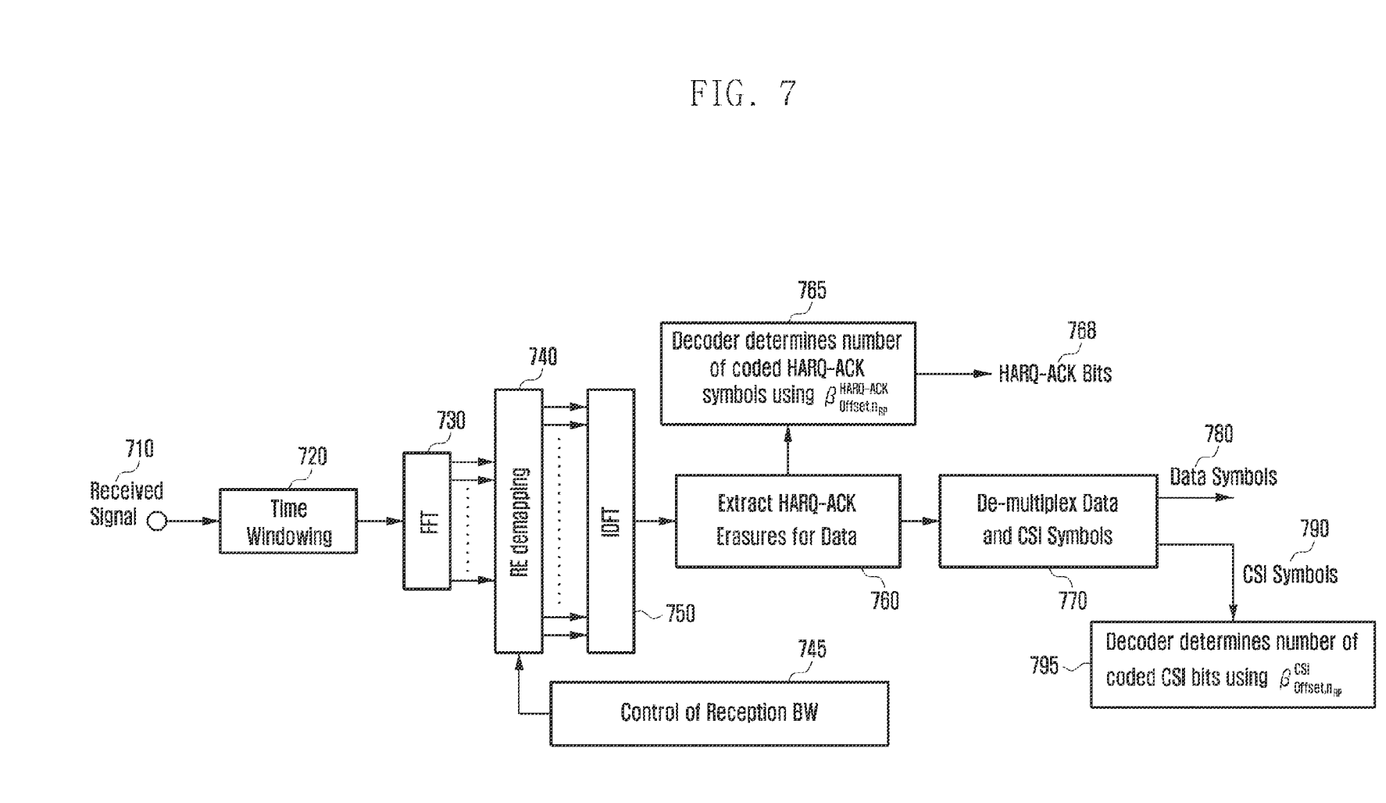
FIG. 7 is a block diagram illustrating a receiver for data information, CSI, and HARQ-ACK in a PUSCH for an indicated set of one or more RPs.

FIG. 7 illustrates a receiver block diagram for data information, CSI, and HARQ-ACK in a PUSCH for an indicated set of one or more RPs.

Referring to FIG. 7, for a PUSCH reception at RP set $n_{RP}$, after an antenna receives the analog signal and after further processing units, the digital signal 710 is filtered by filter 720, a FFT is applied by FFT unit 730, a selector unit 740 selects the REs 745 used by the transmitter, an IDFT unit applies an IDFT 750, a de-multiplexer 760 extracts the HARQ-ACK symbols and places erasures in the corresponding REs for the data symbol and CSI symbols and finally another de-multiplexer 770 separates the data symbols 780 and the CSI symbols 790. The decoder 765 for the HARQ-ACK symbols (if any) provides HARQ-ACK information bits 768 by assuming a number of coded HARQ-ACK symbols determined using a $\beta_{offset,n_{RP}}^{HARQ-ACK}$ value configured for a respective RP set $n_{RP}$ through higher layer signaling. The decoder 795 for CSI symbols (if any) provides CSI information bits 798 by assuming a number of coded CSI symbols determined using a $\beta_{offset,n_{RP}}^{CSI}$ value configured for a respective RP set $n_{RP}$ through higher layer signaling. Additional receiver circuitry such as a channel estimator and demodulators are not shown for brevity.

If an intended set of RP(s) changes at a slow rate, such as for example in tens of subframes or slower, the indication of an intended set of RP(s) can be either implicit, through an indication by higher layer signaling of a parameter value that is uniquely associated with a set of RP(s) or explicit by higher layer signaling. In either case, a $\beta_{offset}^{PUSCH}$ value for a respective UCI type can be selected based on a same association with an intended set of RP(s) as it was previously described and may not additionally signaled by higher layer signaling together with the indication for an intended set of RP(s).

The second embodiment of the present invention considers decoupling a UCI transmission from a data information transmission in UL CoMP or in inter-NodeB UL CA.

If an intended RP for a transmission of data information in a PUSCH is not located at a same node as an intended RP for a UCI transmission or if a delay associated with transferring information from the intended RP for data information to the intended RP of UCI (backhaul delay) is deemed excessive for the latency requirements associated with a UCI, the UCI may then be adaptively included in a PUSCH or in a PUCCH depending on the intended RP for the PUSCH. A first set of TPs scheduling a PDSCH to a UE in a previous subframe may not have respective first set of RPs in a same set of second RPs the UE is scheduled to transmit PUSCH in a present subframe and the UE then needs to decouple transmission of UCI and data information and transmit the former in a PUCCH to the first set of RPs and the latter in a PUSCH to the second set of RPs. A same decoupling of PUCCH and PUSCH transmissions can occur when a UE needs to transmit periodic CSI to a first set of RPs and data information to a second set of RPs in a same subframe.

If UCI is transmitted in a PUCCH to RP(s) that are not the same as the RP(s) for a PUSCH, the parameters for UCI transmission in a PUCCH, such as a set of available resources, a ZC sequence, relevant data/UCI scrambling, hopping patterns, and so on, are determined by the PUCCH RP(s) and not by the PUSCH RP(s).

A UE is assumed to be configured with a set of $\{1, \ldots, N_{RP}\}$ RPs including at least one RP, $n_{RP}^{sp}$, to which UCI should be transmitted. For example, $n_{RP}^{sp}$ may be located at a same node as the scheduler or it may be located at a node incurring acceptable delay in transferring UCI to the node of the scheduler. If a UE is scheduled to transmit a PUSCH to a RP $n_{RP}^{nsp}$, other than RP $n_{RP}^{sp}$, and the UE needs to include UCI in the PUSCH, the UE transmits UCI in a PUCCH to RP $n_{RP}^{sp}$ and transmits PUSCH without that UCI to RP $n_{RP}^{nsp}$. If a UE is scheduled to transmit a PUSCH to RP $n_{RP}^{sp}$ and the UE needs to include UCI in the PUSCH, the UE transmits UCI in the PUSCH to RP $n_{RP}^{sp}$. The above process may only apply for a subset of configured RPs that is additionally configured to a UE. For example, for RPs in this subset of RPs, the latency for transferring UCI to the node of the scheduler may be unacceptably large while for the remaining RPs this latency may be acceptable. Moreover, the above process may be limited only to UEs capable of supporting UL CA as the PUSCH and PUCCH may be transmitted to RPs in different cells.

Figure 8:
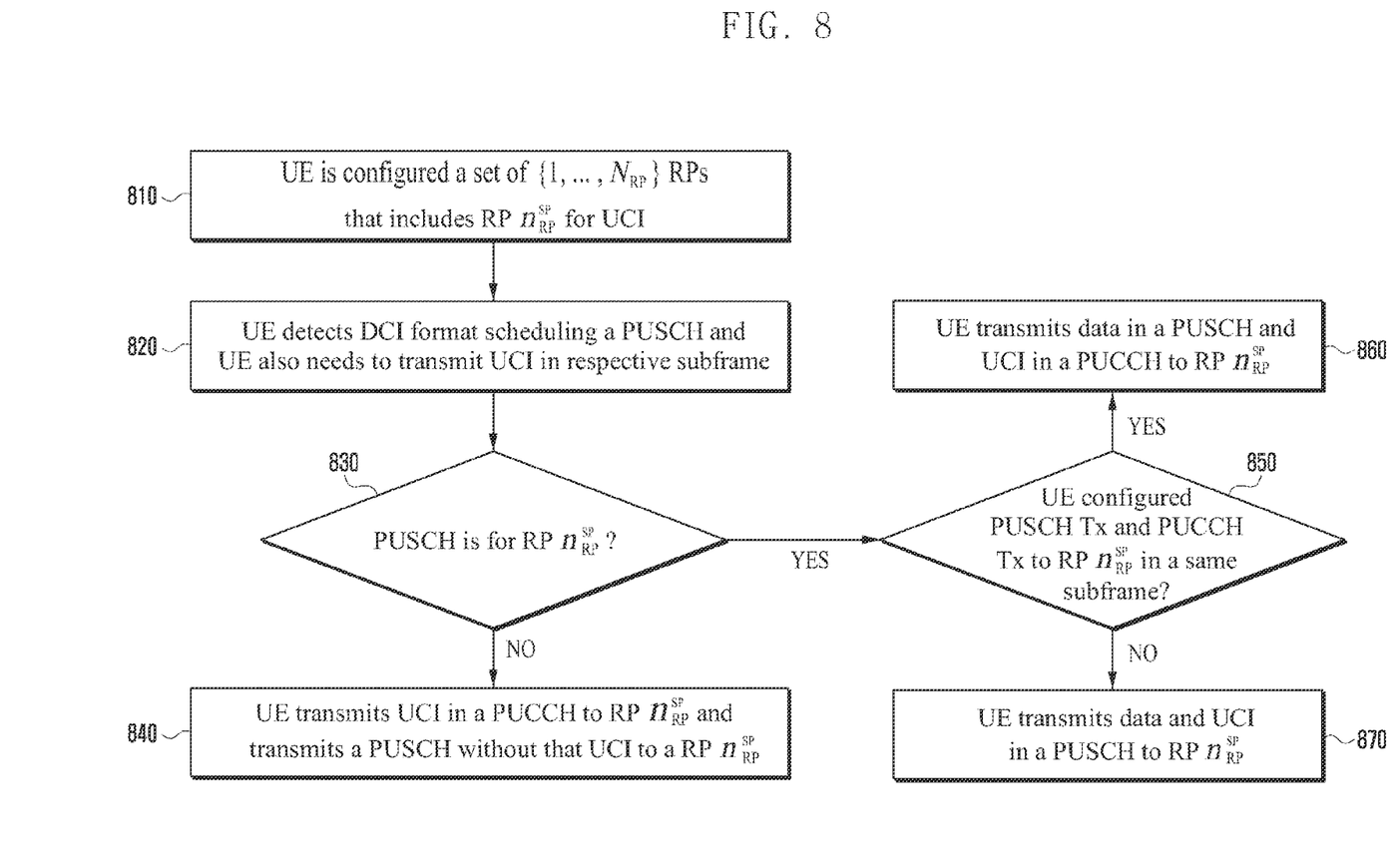
FIG. 8 is a diagram illustrating a transmitter process for determining a channel for UCI transmission to a RP.

FIG. 8 illustrates a transmitter process for determining a channel for UCI transmission to a RP.

Referring to FIG. 8, a UE is configured by higher layers a set of $\{1, \ldots, N_{RP}\}$ RPs which includes at least an RP n to which the UE should transmit UCI 810. A UE detects a PDCCH conveying a DCI format scheduling a PUSCH in an UL subframe and the UE also needs to transmit UCI in the same UL subframe 820. The UE examines if the PUSCH transmission is for RP $n_{RP}^{sp}$ 830. If it is not for RP $n_{RP}^{sp}$ and it is for another RP $n_{RP}^{sp}$ in the configured set of RPs, the UE transmits UCI in a PUCCH to RP $n_{RP}^{sp}$ and transmits a PUSCH without that UCI to RP $n_{RP}^{sp}$ 840. If it is for RP $n_{RP}^{sp}$ and the UE is configured to transmit UCI in a PUCCH and data in a PUSCH in a same subframe to RP $n_{RP}^{sp}$ 850, the UE transmits data in a PUSCH and UCI in a PUCCH to RP $n_{RP}^{sp}$ 860. If it is for RP $n_{RP}^{sp}$ and the UE is not configured to transmit UCI in a PUCCH and data in a PUSCH in a same subframe to RP $n_{RP}^{sp}$, the UE transmits data and UCI in a PUSCH to RP $n_{RP}^{sp}$ 870.

The functionality described in FIG. 8, may be applicable only for UEs configured to support PUSCH and PUCCH transmissions in a same subframe. Otherwise, for UEs not configured to support PUSCH and PUCCH transmissions in a same subframe, UCI is multiplexed with data and transmitted in a PUSCH.

In addition to avoiding the latency incurred by transmitting UCI to an RP located at a node incurring excessive delay in transferring UCI to the node of the scheduler, separating data and UCI transmission in respective PUSCH and PUCCH can be beneficial when the different RPs use different features for UCI processing such as for example, the RP of the node with the scheduler may support a particular method for bundling HARQ-ACK bits which may not be supported by nodes corresponding to other RPs.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting an uplink control information (UCI) type by a user equipment (UE), the method comprising:

receiving higher layer signaling information including a plurality of offset values $\{\beta_{offset,1}^{UCI-type}, \Lambda, \beta_{offset, N_{RP}}^{UCI-type}\}$ corresponding to sets of reception points (RPs) ($N_{RP}$), the plurality of offset values being used for transmitting the UCI to at least two base stations;

determining a number of coded modulation symbols per spatial layer Q' for the UCI type based on the offset value $\beta_{offset, n_{RP}}^{UCI-type}$ corresponding to a set of RPs ($n_{RP}$) determined from the sets of RPs ($N_{RP}$), the sets of RPs ($N_{RP}$) including the set of RPs ($n_{RP}$);

multiplexing per spatial layer the Q' coded modulation symbols for the UCI type in a physical uplink shared channel (PUSCH); and transmitting the PUSCH.

2. The method of claim 1, wherein each of the offset values $\{\beta_{offset,1}^{UCI-type}, \Lambda, \beta_{offset, N_{RP}}^{UCI-type}\}$ is transmitted to the UE using separate information elements of higher layer signaling.

3. The method of claim 2, wherein the separate information elements of higher layer signaling further include an identity of a respective set of RPs.

4. The method of claim 1, wherein the number of coded modulation symbols per spatial layer Q' is determined as $$Q' = \min\left(\left\lceil \frac{O \cdot M_{sc}^{PUSCH-initial} \cdot N_{symb}^{PUSCH-initial} \cdot \beta_{offset,n_{RP}}^{UCI-type}}{\sum_{r=0}^{C-1} K_r} \right\rceil, 4 \cdot M_{sc}^{PUSCH}\right)$$

where O is a number of information bits for the UCI type, $M_{sc}^{PUSCH}$ is a PUSCH transmission bandwidth in the TTI, $N_{symb}^{PUSCH-initial}$ is a number of TTI symbols for initial PUSCH transmission for a same data TB, $M_{sc}^{PUSCH-initial}$ is a PUSCH transmission bandwidth for initial PUSCH transmission for a same data TB, C is a number of code blocks, and $K_r$ is a number of bits for code block number r.

5. The method of claim 4, wherein the UCI type is acknowledgment information associated with a hybrid automatic repeat request (HARQ) process (HARQ-ACK) and $\beta_{offset,N_{RP}}^{UCI-type} = \beta_{offset,N_{RP}}^{HARQ-ACK}$ or the UCI type is a rank indicator (RI) and $\beta_{offset,N_{RP}}^{UCI-type} = \beta_{offset,N_{RP}}^{RI}$.

6. The method of claim 1, wherein for any two RPs in a same set of RPs the latency of information exchange is smaller than or equal to a predetermined value and for any two RPs in different sets of RPs the latency of information exchange is larger than the predetermined value.

7. The method of claim 1, wherein at least one set of RPs from the $\{1, \Lambda, N_{RP}\}$ sets of RPs includes only one RP.

8. The method of claim 1, wherein the UE determines the one set $n_{RP}$ from signaling scheduling the PUSCH or from a number of the TTI in a total number of TTIs.

9. A method for transmitting uplink control information (UCI) by a user equipment (UE), the method comprising: determining a first reception point (RP) in which to transmit the UCI including at least one of a hybrid automatic repeat request (HARQ) acknowledge (ACK) information or channel state information (CSI); determining a second RP in which to transmit uplink data; transmitting the UCI in a physical uplink control channel (PUCCH) to the first RP and transmitting the uplink data in a physical uplink shared channel (PUSCH) to the second RP when the first RP is different from the second RP; and transmitting the UCI to the first RP when the first RP and the second RP are the same RP.

10. The method of claim 9, wherein the UE apparatus determines the first RP and the second RP from a set of transmission points scheduling a physical downlink shared channel (PDSCH) to the UE in a previous TTI or from a number of the TTI in a total number of TTIs.

11. The method of claim 9, wherein transmitting the UCI comprises selecting transmission parameters associated with the transmission of the UCI.

12. The method of claim 11, wherein the transmission parameters include at least a scrambling sequence for scrambling respective data information or UCI and a Zadoff-Chu sequence for generating a reference signal.

13. The method of claim 9,
wherein the first RP is associated with a first set of RPs and the second RP is associated with a second set of RPs, and
wherein at least one of the first set of RPs and the second set of RPs includes only one RP.

14. A user equipment (UE) apparatus for transmitting an uplink control information (UCI) type, the apparatus comprising: an encoder circuit configured to receive higher layer signaling information including a plurality of offset values $\{\beta_{offset,1}^{UCI-type}, \ldots, \beta_{offset,N_{RP}}^{UCI-type}\}$ corresponding sets of reception points (RPs) ($N_{RP}$), the plurality of offset values being used for transmitting the UCI to at least two base stations, and determine a number of coded modulation symbols per spatial layer Q' for the UCI type based on the offset value of $\beta_{offset,N_{RP}}^{UCI-type}$ corresponding to a set of RPs $n_{RP}$ determined from the sets of RPs (NRP), including the set of RPs ($n_{RP}$); a multiplexer configured to multiplex per spatial layer the Q' coded modulation symbols for the UCI type in a physical uplink shared channel (PUSCH); and an antenna configured to transmit the O' coded modulation symbols over the PUSCH.

15. The apparatus of claim 14, wherein each of the offset values $\{\beta_{offset,1}^{UCI-type}, \Lambda, \beta_{offset,N_{RP}}^{UCI-type}\}$ is transmitted to the UE using separate information elements of higher layer signaling.

16. The apparatus of claim 15, wherein the separate information elements of higher layer signaling further include an identity of a respective set of RPs.

17. The apparatus of claim 14, wherein the number of coded modulation symbols per spatial layer Q' is determined as $$Q' = \min\left(\left\lceil \frac{O \cdot M_{sc}^{PUSCH-initial} \cdot N_{symb}^{PUSCH-initial} \cdot \beta_{offset,n_{RP}}^{UCI-type}}{\sum_{r=0}^{C-1} K_r} \right\rceil, 4 \cdot M_{sc}^{PUSCH}\right)$$

where O is a number of information bits for the UCI type, $M_{sc}^{PUSCH}$ is a PUSCH transmission bandwidth in the TTI, $N_{symb}^{PUSCH-initial}$ is s a number of TTI symbols for initial PUSCH transmission for a same data TB, $M_{sc}^{PUSCH-initial}$ is a PUSCH transmission bandwidth for initial PUSCH transmission for a same data TB, C is a number of code blocks, and $K_r$ is a number of bits for code block number r.

18. The apparatus of claim 17, wherein the UCI type is acknowledgment information associated with a hybrid automatic repeat request (HARQ) process (HARQ-ACK) and $\beta_{offset,N_{RP}}^{UCI-type} = \beta_{offset,N_{RP}}^{HARQ-ACK}$, or the UCI type is a rank indicator (RI) and $\beta_{offset,N_{RP}}^{UCI-type} = \beta_{offset,N_{RP}}^{RI}$.

19. The apparatus of claim 14, wherein for any two RPs in a same set of RPs the latency of information exchange is less than or equal to a predetermined value and for any two RPs in different sets of RPs the latency of information exchange is larger than the predetermined value.

20. The apparatus of claim 14, wherein at least one set of RPs from the $\{1, \Lambda, N_{RP}\}$ sets of RPs includes only one RP.

21. The apparatus of claim 14, wherein the UE apparatus determines the one set $n_{RP}$ from signaling scheduling the PUSCH or from a number of the TTI in a total number of TTIs.

22. A user equipment (UE) apparatus for transmitting uplink control information (UCI), the apparatus comprising:
controller configured to:
determine a first reception point (RP) in which to transmit the UCI including at least one of hybrid automatic repeat request (HARQ) acknowledge (ACK) information or channel state information (CSI), and
determine a second RP in which to transmit uplink data; and
an antenna configured to:
transmit the UCI in a physical uplink control channel (PUCCH) to the first RP and transmit the uplink data in a physical uplink shared channel (PUSCH) to the second RP if the first RP is different from the second RP, and
transmit the UCI in the PUSCH to the first RP if the first RP and the second RP are the same RP.

23. The apparatus of claim 22, wherein the controller is further configured to determine the first RP and the second RP from a set of transmission points scheduling a physical downlink shared channel (PDSCH) to the UE in a previous TTI or from a number of the TTI in a total number of TTIs.

24. The apparatus of claim 22, wherein the controller is further configured to select transmission parameters associated with the transmission of the UCI.

25. The apparatus of claim 24, wherein the transmission parameters include at least a scrambling sequence for scrambling respective data information or UCI and a Zadoff-Chu sequence for generating a reference signal.

26. The apparatus of claim 22,
wherein the first RP is associated with a first set of RPs and the second RP is associated with a second set of RPs, and
wherein at least one of the first set of RPs and the second set of PRs includes only one RP.

* * * * *